G. L. CASE.
TRUCK LOADING ATTACHMENT.
APPLICATION FILED FEB. 5, 1918.
1,315,814.
Patented Sept. 9, 1919.
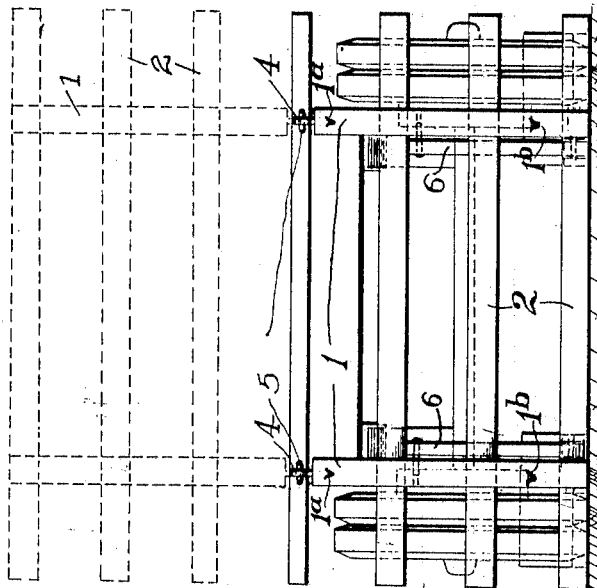
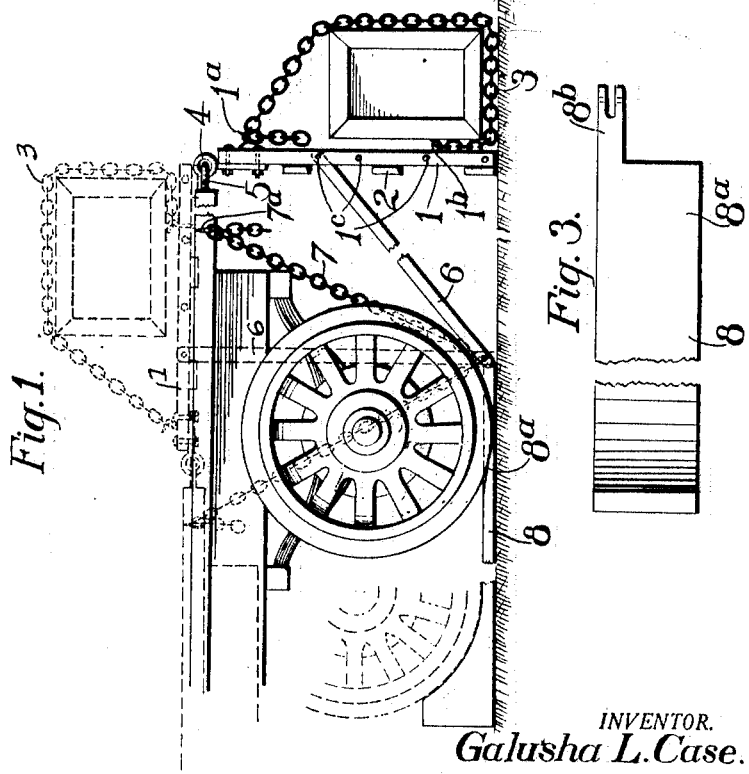
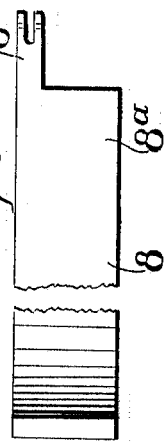
INVENTOR.
Galusha L. Case.
BY
A. B. Bonman
ATTORNEY.

UNITED STATES PATENT OFFICE.

GALUSHA L. CASE, OF SAN DIEGO, CALIFORNIA.

TRUCK-LOADING ATTACHMENT.

1,315,814. Specification of Letters Patent. Patented Sept. 9, 1919.

Application filed February 5, 1918. Serial No. 215,417.

*To all whom it may concern:*

Be it known that I, GALUSHA L. CASE, a citizen of the United States, residing at San Diego, in the county of San Diego and State of California, have invented certain new and useful Improvements in Truck-Loading Attachments, of which the following is a specification.

My invention relates to an attachment to be used in connection with trucks to facilitate the loading of heavy articles particularly, and;

The objects of my invention are: first, to provide an attachment to be used in connection with trucks by the use of which the power of the truck may be used for raising the load up into a position even with the top surface of the platform of the truck so that it may be readily moved onto the truck platform: second, to provide an attachment of this class a portion of which may be used as the end gate of the truck when not used for loading: third, to provide an attachment of this class which is adjustable and applicable for use for loading different sized and shaped packages or articles: fourth, to provide an attachment of this class which may be readily applied to trucks already in use and fifth, to provide an attachment of this class which is simple, economical of construction, durable, easy to operate, easy to install and which will not readily deteriorate or get out of order.

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon, which form a part of this specification in which:

Figure 1 is a side elevational view of a fragmentary rear end of a truck, showing my attachment in position thereon and ready to start loading a box, by solid lines and showing by dotted lines the position of the truck and attachment with the box when raised into position ready to be shifted onto the truck; Fig. 2 is a rear end view of the truck and the attachment minus the box and chains shown by solid lines and showing a portion of the attachment up in position for use as an end gate by dotted lines: and Fig. 3 is a detailed fragmentary top view of the traction member upon which the truck runs for supporting the attachment.

Similar characters of reference refer to similar parts throughout the several views of the drawings.

The main supporting bars 1, transverse bars 2, chains 3, hinge members 4, hinge members 5, fulcrum members 6, chains 7, and traction members 8, constitute the principal parts of my truck attachment.

The supports 1 are of suitable strength and of the proper length to reach from the truck platform to the ground, to one end of each of the bars 1 are secured the hinge members 4 which engage the hinge members 5 which are secured in the rear end of the truck platform. To the two bars 1 are secured a plurality of transverse bars 2 which extend past the bars 1 forming a frame for an end gate when up, as shown by dotted lines in Fig. 2 of the drawings and for supporting the load when raising it in position level with the floor of the truck. Secured to each of these bars 1 is a chain 3 by means of hooks $1^a$ and $1^b$, the one end of said chain is hooked over said hook $1^b$ then the article to be loaded is placed into position against the bars 1 or 2 as desired and the chains 3 wrapped around the same and locked on the hook $1^a$ for supporting the article to be loaded. Placed in front of the rear wheel of the truck and provided with a beveled surface $8^a$ for the truck wheel to rise on are the traction members 8 and pivotally connected to these traction members 8 by means of the extended lug $8^b$ are the fulcrum members 6 and their other ends are pivotally connected to the supports 1.

It will be here noted that the supports 1 are provided with a plurality of holes $1^c$ to permit the adjustment of the connection of the fulcrum members 6 relatively to the supports 1 to provide for varying surfaces of ground and for different kinds and classes of articles to be loaded and connecting with the lower ends of the fulcrum members 6 are the one ends of the chains 7 and their upper ends are adapted to be hooked over hooks $7^a$ in the sides of the truck platform. This provides additional means for supporting the ends of the fulcrum members 6 relatively to the truck floor.

Though I have shown and described a particular construction, combination and arrangement of parts and a certain modification thereof, I do not wish to be limited to this particular construction, combination, and arrangement nor to the modification thereof, but desire to include in the purview of my invention the construction, combination and arrangement substantially as set forth in the appended claims.

It is obvious that with this construction there is provided an attachment which may be readily secured to trucks by the use of which heavy loads may be raised to a position level with the floor of the truck by moving the truck forward by its own power, that a portion of this supporting apparatus may be used as an end gate of the truck if desired, that the rear wheels of the truck when driven onto the traction members 8 will hold the traction members 8 in the position and the fulcrum members will raise the supports 1 to a horizontal position with the forward movement of the truck after which the chains 3 may be loosened and the article to be loaded moved forward onto the truck platform that in places where there is no pavement the modified form of fulcrum members 6 may be used and the traction members 8 may be dispensed with. The points 6ª in the ground, hold the ends in the proper positions relatively to the truck.

Having thus described my invention, what I claim as new and desire to secure by Letters Patent, is:

1. In an apparatus of the class described the combination with a truck of a supporting frame pivotally mounted on the rear end of the truck platform, fulcrum members pivotally connected to said frame at their one ends and traction members adapted for the truck wheels to run upon to which the other ends of said fulcrum members are pivotally connected.

2. In an apparatus of the class described, the combination with a truck, of a supporting frame pivotally mounted on the rear end of the truck platform, fulcrum members pivotally connected to said frame at their one ends, traction members adapted for the truck wheels to run upon to which the other ends of said fulcrum members are pivotally connected and means connected to said supporting frame for securing the load thereto.

3. In an apparatus of the class described, the combination with a truck, of a supporting frame pivotally mounted on the rear end of the truck platform, fulcrum members pivotally connected to said frame at their one ends, traction members adapted for the truck wheels to run upon to which the other ends of said fulcrum members are pivotally connected, means connected to said supporting frame for securing the load thereto and means for supporting the pivotal connections of said traction members and said fulcrum members relatively to the truck platform.

4. A loading skid including a skid proper adapted for swinging connection at one end with a vehicle, fulcrum means pivotally connected with the skid proper, and traction means for anchoring the fulcrum means and having a relatively large traction surface.

5. A loading skid including a skid proper adapted for swinging connection at one end with a vehicle, fulcrum means pivotally connected with the skid proper, and traction means for anchoring the fulcrum means, the said traction means being adapted to receive corresponding wheels of a vehicle thereon.

6. A loading skid including a skid proper adapted for swinging connection at one end with a vehicle, fulcrum means pivotally connected with the skid proper, and means pivotally connected with said fulcrum means and adapted to rest against the ground for anchoring the said fulcrum means.

7. A loading skid including a skid proper adapted for swinging connection at one end with a vehicle, fulcrum means pivotally connected with the skid proper, and spaced traction means for anchoring the said fulcrum means and projecting laterally at one side of the said fulcrum means.

8. A loading skid including a skid proper adapted for swinging connection at one end with a vehicle, fulcrum means pivotally connected with the skid proper and spaced traction shoes for anchoring the said fulcrum means.

9. A loading skid including a skid proper adapted for swinging connection at one end with a vehicle, fulcrum means pivotally connected with the skid proper intermediate of the ends thereof, and spaced traction shoes for anchoring the said fulcrum means, the said shoes being elongated and spaced apart for receiving the rear wheels of a vehicle thereon.

In testimony whereof, I have hereunto set my hand at Oceanside, California this 25th day of January, 1918.

GALUSHA L. CASE.

Copies of this patent may be obtained for five cents each, by addressing the "Commissioner of Patents, Washington, D. C."